United States Patent
Fei et al.

(10) Patent No.: US 9,066,332 B2
(45) Date of Patent: Jun. 23, 2015

(54) METHOD, DEVICE AND TERMINAL FOR INDICATING MULTI-PORT FREQUENCY DOMAIN RESOURCE LOCATION ALLOCATION INFORMATION

(75) Inventors: Peiyan Fei, Shenzhen (CN); Focai Peng, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 124 days.

(21) Appl. No.: 13/806,848

(22) PCT Filed: Nov. 24, 2011

(86) PCT No.: PCT/CN2011/082894
§ 371 (c)(1),
(2), (4) Date: Dec. 26, 2012

(87) PCT Pub. No.: WO2012/129920
PCT Pub. Date: Oct. 4, 2012

(65) Prior Publication Data
US 2013/0100923 A1   Apr. 25, 2013

(30) Foreign Application Priority Data
Mar. 25, 2011 (CN) .......................... 2011 1 0074112

(51) Int. Cl.
*H04L 12/28* (2006.01)
*H04W 4/00* (2009.01)
*H04W 72/04* (2009.01)

(52) U.S. Cl.
CPC .......... *H04W 72/04* (2013.01); *H04W 72/0453* (2013.01); *H04W 72/042* (2013.01)

(58) Field of Classification Search
USPC ................. 370/252–311, 329–338, 344–395; 455/450–501, 509–522
See application file for complete search history.

(56) References Cited

U.S. PATENT DOCUMENTS 6,804,211 B1   10/2004 Klein
8,130,640 B2 *  3/2012 Klein et al. ................... 370/229
(Continued)

FOREIGN PATENT DOCUMENTS

CN   101272615 A   9/2008
CN   101686543 A   3/2010
(Continued)

OTHER PUBLICATIONS

International Search Report on international application No. PCT/CN2011/082894, mailed on Mar. 8, 2012. (2 pages).
(Continued)

*Primary Examiner* — Man Phan
(74) *Attorney, Agent, or Firm* — Oppedahl Patent Law Firm LLC

(57) ABSTRACT

The disclosure provides a method, device and terminal for indicating multi-port frequency domain resource location allocation information, wherein the method includes: determining the number of total bits of multi-port frequency domain resource location allocation information according to a system bandwidth; determining the number of bits of uplink frequency domain resource location allocation information according to the system bandwidth; and placing the bits of the uplink frequency domain resource location allocation information in alignment with an LBS bit of the total bits of the multi-port frequency domain resource location allocation information or an MBS bit of the total bits of the multi-port frequency domain resource location allocation information. By means of the disclosure, the problem that the number of total bits of multi-port frequency domain resource location allocation information is insufficient to indicate a single cluster of uplink resource location allocation information under some system bandwidths during uplink transmission can be avoided.

7 Claims, 5 Drawing Sheets

(56) References Cited

U.S. PATENT DOCUMENTS

| | | | |
|---|---|---|---|
| 8,179,857 B2* | 5/2012 | Kwon et al. | 370/330 |
| 8,379,622 B2* | 2/2013 | McBeath et al. | 370/349 |
| 8,787,290 B2* | 7/2014 | Dai | 370/329 |
| 2005/0058098 A1 | 3/2005 | Klein | |
| 2005/0259662 A1* | 11/2005 | Kim et al. | 370/395.4 |
| 2006/0268798 A1* | 11/2006 | Kim et al. | 370/338 |
| 2007/0140165 A1* | 6/2007 | Kim et al. | 370/329 |
| 2009/0161623 A1 | 6/2009 | Klein | |
| 2010/0323733 A1* | 12/2010 | Klein et al. | 455/501 |
| 2011/0085513 A1* | 4/2011 | Chen et al. | 370/330 |
| 2011/0134892 A1* | 6/2011 | Shirakabe et al. | 370/336 |
| 2012/0108255 A1* | 5/2012 | Jo et al. | 455/450 |
| 2012/0115526 A1 | 5/2012 | Ogawa | |
| 2012/0236802 A1* | 9/2012 | Gong | 370/329 |

FOREIGN PATENT DOCUMENTS

| | | |
|---|---|---|
| JP | 2012034145 A | 2/2012 |
| KR | 1020100009362 A | 1/2010 |
| WO | 2011016252 A1 | 2/2011 |

OTHER PUBLICATIONS

English Translation of the Written Opinion of the International Search Authority in international application No. PCT/CN2011/082894, mailed on Mar. 8, 2012. (6 pages).

3GPP TSG RAN WG1 #54bis, DC1 format for semi-persistent scheduling, R1-083602, ZTE, Prague, Czech Republic, Sep. 24, 2008.

3GPP TSG RAN WG1 Meeting #57bis, Non-contiguous uplink resource allocation for LTE-A, R1-092730, ASUSTeK, Los Angeles, USA, Jun. 23, 2009.

3GPP TSG RAN #56bis, DC1 for uplink non-contiguous RB allocations, R1-091349, Motorola, Seoul, Korea, Mar. 18, 2009.

Supplementary European Search Report in European application No. 11862545.8, mailed on Mar. 19, 2015.

* cited by examiner

METHOD, DEVICE AND TERMINAL FOR INDICATING MULTI-PORT FREQUENCY DOMAIN RESOURCE LOCATION ALLOCATION INFORMATION

TECHNICAL FIELD

The disclosure relates to the mobile communication field, and in particular to a method, device and terminal for indicating multi-port frequency domain resource location allocation information.

BACKGROUND

In a frequency division multiplexing system based on Long Term Evolution (LTE) proposed by the 3rd Generation Partnership Project (3GPP), an uplink physical channel sends data by a single antenna and allocates resources continuously, which limits a rate of sending uplink data, and cannot make resources utilized flexibly, for example, in a case when multiple segmented frequency bands exist within a system bandwidth.

Compared with a prior system, an Advanced International Mobile Telecommunication (IMT-Advanced) system requires a higher data rate and a larger system capacity. In order to meet requirements of IMT-Advanced, Advanced LTE (LTE-A), as an evolved standard of the LTE, has proposed a technology for allocating uplink discontinuous resources, by which a use ratio of frequency spectrum of an IMT-Advanced system can be improved.

Meanwhile, in order to meet requirements on an uplink transmission rate of the IMT-Advanced, the LTE-A has proposed a multi-port transmission mode, in which uplink backward transmission can support multiple transmission blocks. According to present discussion, for uplink of an LTE-A system, a UE can at most support two transmission blocks to be sent at the same time.

Rapid development of digital communication systems requires higher data communication reliability, however, when a channel is poor, multipath interference, Doppler frequency shift and the like affect system performances seriously. Thus, in order to adapt to the requirement on the high data rate of a terminal, when data are uplinked, the concept of allocating resources under multiple ports is designed for resource allocation, so as to increase the probability of correct reception when data are transmitted.

In an existing LTE system, the number of total bits required by frequency domain resource location allocation information used for indicating uplink subframes under multiple ports is $$\left\lceil \log_2\left(\binom{\lceil N_{RB}^{UL}/P + 1 \rceil}{4}\right)\right\rceil.$$

Where, $N_{RB}^{UL}$ expresses an uplink system bandwidth, P expresses a size of a Resource Block Group (RBG), and the value of P depends on $N_{RB}^{UL}$, as shown in Table 1.

TABLE 1

| System bandwidth $N_{RB}^{UL}$ | RBG size (P) |
|---|---|
| ≤10 | 1 |
| 11-26 | 2 |
| 27-63 | 3 |
| 64-110 | 4 |

The total bits of multi-port frequency domain resource location allocation information provided in an existing method can indicate the condition of multi clusters of uplink resource location allocation information, but the number of the total bits may be insufficient to indicate a single cluster of uplink resource location allocation information occurs within a certain bandwidth. For example, when system bandwidths are 11RB, 12RB, 16RB, 27RB, 32RB, 33RB, the number of total bits of multi-port frequency domain resource location allocation information in an existing LTE technology are 6, 6, 7, 8, 9, 9 respectively, at this moment, if a single cluster is utilized to indicate frequency domain resource location allocation information, then the number of total bits required within corresponding bandwidths is 7, 7, 8, 9, 10, 10 respectively.

SUMMARY

In view of the above, the main purpose of the disclosure is to provide a method, device and terminal for indicating multi-port frequency domain resource location allocation information, so as to solve the problem that the number of total bits of multi-port frequency domain resource location allocation information is insufficient to indicate a single cluster of uplink resource location allocation information within a certain system bandwidth during uplink transmission.

In order to solve the technical problem above, the technical solution of the disclosure is realized as follows.

The disclosure provides a method for indicating multi-port frequency domain resource location allocation information, which includes:

determining the number of total bits of multi-port frequency domain resource location allocation information according to a system bandwidth;

determining the number of bits of uplink frequency domain resource location allocation information according to the system bandwidth; and placing the bits of the uplink frequency domain resource location allocation information in alignment with an LBS bit of the total bits of the multi-port frequency domain resource location allocation information or with an MBS bit of the total bits of the multi-port frequency domain resource location allocation information.

Wherein, the determining the number of total bits of multi-port frequency domain resource location allocation information according to a system bandwidth may include:

when the system bandwidth $N_{RB}^{UL}$ acquired is within a set {11RB, 12RB, 16RB, 27RB, 32RB, 33RB}, the number of the total bits of the multi-port frequency domain resource location allocation information is:

$$\left\lceil \log_2\left(\binom{\lceil N_{RB}^{UL}/P + 2 \rceil}{4}\right)\right\rceil \text{ or } \left\lceil \log_2\left(\binom{\lceil N_{RB}^{UL}/P \rceil + 2}{4}\right)\right\rceil;$$

and when the system bandwidth $N_{RB}^{UL}$ acquired is not within the set {11RB, 12RB, 16RB, 27RB, 32RB, 33RB}, the number of the total bits of the multi-port frequency domain resource location allocation information is:

$$\left\lceil \log_2\left(\binom{\lceil N_{RB}^{UL}/P + 1 \rceil}{4}\right)\right\rceil;$$

where P is a size of a RBG.

Wherein, the determining the number of total bits of multi-port frequency domain resource location allocation information according to a system bandwidth may include:

when the total bits of the multi-port frequency domain resource location allocation information are only used to indicate the uplink frequency domain resource location allocation information, the number of the total bits of the multi-port frequency domain resource location allocation information is:

$$\max\left\{\left\lceil\log_2\left(\binom{\lceil N_{RB}^{UL}/P+1\rceil}{4}\right)\right\rceil, \lceil\log_2(N_{RB}^{UL}(N_{RB}^{UL}+1)/2)\rceil\right\};$$

where P is a size of a RBG and $N_{RB}^{UL}$ is the system bandwidth.

Wherein, the determining the number of total bits of multi-port frequency domain resource location allocation information according to a system bandwidth may include:

when the total bits of the multi-port frequency domain resource location allocation information are only used to indicate the uplink frequency domain resource location allocation information, the number of the total bits of the multi-port frequency domain resource location allocation information is:

$$\left\lceil\log_2\left(\binom{\lceil N_{RB}^{UL}/P+2\rceil}{4}\right)\right\rceil \text{ or } \left\lceil\log_2\left(\binom{\lceil N_{RB}^{UL}/P\rceil+2}{4}\right)\right\rceil;$$

and when the total bits of the multi-port frequency domain resource location allocation information are not only used to indicate the uplink frequency domain resource location allocation information, the number of the total bits of the multi-port frequency domain resource location allocation information is:

$$\left\lceil\log_2\left(\binom{\lceil N_{RB}^{UL}/P+n\rceil}{4}\right)\right\rceil \text{ or } \left\lceil\log_2\left(\binom{\lceil N_{RB}^{UL}/P\rceil+n}{4}\right)\right\rceil;$$

where P is a size of a RBG, $N_{RB}^{UL}$ is the system bandwidth, and n>2.

Wherein, when the number of the bits of the uplink frequency domain resource location allocation information is the number of bits of a single cluster of uplink frequency domain resource location allocation information, the number of the bits of the single cluster of uplink frequency domain resource location allocation information determined according to the system bandwidth may be $\lceil\log_2(N_{RB}^{UL}(N_{RB}^{UL}+1)/2)\rceil$; where $N_{RB}^{UL}$ is the system bandwidth.

The disclosure further provides a device for indicating multi-port frequency domain resource location allocation information, which includes:

a first determination module configured to determine the number of total bits of multi-port frequency domain resource location allocation information according to a system bandwidth;

a second determination module configured to determine the number of bits of uplink frequency domain resource location allocation information according to the system bandwidth;

an indicating module configured to place the bits of the uplink frequency domain resource location allocation information in alignment with an LBS bit of the total bits of the multi-port frequency domain resource location allocation information or with an MBS bit of the total bits of the multi-port frequency domain resource location allocation information.

Wherein, the first determination module may be further configured to, when the system bandwidth $N_{RB}^{UL}$ acquired is within a set {11RB, 12RB, 16RB, 27RB, 32RB, 33RB}, determine, according to the system bandwidth, the number of the total bits of the multi-port frequency domain resource location allocation information as:

$$\left\lceil\log_2\left(\binom{\lceil N_{RB}^{UL}/P+2\rceil}{4}\right)\right\rceil \text{ or } \left\lceil\log_2\left(\binom{\lceil N_{RB}^{UL}/P\rceil+2}{4}\right)\right\rceil;$$

and the first determination module may be further configured to, when the system bandwidth $N_{RB}^{UL}$ acquired is not within the set {11RB, 12RB, 16RB, 27RB, 32RB, 33RB}, determine, according to the system bandwidth, the number of the total bits of the multi-port frequency domain resource location allocation information is:

$$\left\lceil\log_2\left(\binom{\lceil N_{RB}^{UL}/P+1\rceil}{4}\right)\right\rceil;$$

where P is a size of a RBG.

Wherein, the first determination module may be further configured to, when the total bits of the multi-port frequency domain resource location allocation information are only used to indicate the uplink frequency domain resource location allocation information, determine, according to the system bandwidth, the number of the total bits of the multi-port frequency domain resource location allocation information is:

$$\max\left\{\left\lceil\log_2\left(\binom{\lceil N_{RB}^{UL}/P+1\rceil}{4}\right)\right\rceil, \lceil\log_2(N_{RB}^{UL}(N_{RB}^{UL}+1)/2)\rceil\right\};$$

where P is a size of a RBG and $N_{RB}^{UL}$ is the system bandwidth.

Wherein, the first determination module may be further configured to, when the total bits of the multi-port frequency domain resource location allocation information are only used to indicate the uplink frequency domain resource location allocation information, determine, according to the system bandwidth, the number of the total bits of the multi-port frequency domain resource location allocation information is:

$$\left\lceil\log_2\left(\binom{\lceil N_{RB}^{UL}/P+2\rceil}{4}\right)\right\rceil \text{ or } \left\lceil\log_2\left(\binom{\lceil N_{RB}^{UL}/P\rceil+2}{4}\right)\right\rceil;$$

and the first determination module may be further configured to, when the total bits of the multi-port frequency domain resource location allocation information are not only used to indicate the uplink frequency domain resource location allocation information, determine, according to the system bandwidth, the number of the total bits of the multi-port frequency domain resource location allocation information is:

$$\left\lceil \log_2\left(\binom{\lceil N_{RB}^{UL}/P + n \rceil}{4}\right)\right\rceil \text{ or } \left\lceil \log_2\left(\binom{\lceil N_{RB}^{UL}/P \rceil + n}{4}\right)\right\rceil;$$

where P is a size of a RBG, $N_{RB}^{UL}$ is the system bandwidth, and n>2.

Wherein, the second determination module may be further configured to determine, according to the system bandwidth, the number of bits of a single cluster of uplink frequency domain resource location allocation information is $\lceil \log_2(N_{RB}^{UL}(N_{RB}^{UL}+1)/2)\rceil$; where $N_{RB}^{UL}$ is the system bandwidth.

The disclosure further provides a terminal, which includes:

a receiving module configured to receive multi-port frequency domain resource location allocation information from a network side;

a first demodulation module configured to the number of total bits of the multi-port frequency domain resource location allocation information according to a system bandwidth;

a second demodulation module configured to determine the number of bits of uplink frequency domain resource location allocation information according to the system bandwidth; and a third demodulation module configured to place the bits of the uplink frequency domain resource location allocation information in alignment with an LBS bit of the total bits of the multi-port frequency domain resource location allocation information or with an MBS bit of the total bits of the multi-port frequency domain resource location allocation information.

Wherein, the third demodulation module may be further configured to, based on the manner of placing the bits of the uplink frequency domain resource location allocation information in alignment with the LBS bit of the total bits of the multi-port frequency domain resource location allocation information, acquire the uplink frequency domain resource location allocation information from a side of a least bit of the total bits of the multi-port frequency domain resource location allocation information according to the number of the bits of the uplink frequency domain resource location allocation information; and the third demodulation module may be further configured to, based on the manner of placing the bits of the uplink frequency domain resource location allocation information in alignment with the MBS bit of the total bits of the multi-port frequency domain resource location allocation information, acquire the uplink frequency domain resource location allocation information from a side of a most bit of the total bits of the multi-port frequency domain resource location allocation information according to the number of the bits of the uplink frequency domain resource location allocation information.

Wherein, the first demodulation module may be further configured to, when a system bandwidth $N_{RB}^{UL}$ acquired is within a set {11RB, 12RB, 16RB, 27RB, 32RB, 33RB}, determine, according to the system bandwidth, the number of the total bits of the multi-port frequency domain resource location allocation information is:

$$\left\lceil \log_2\left(\binom{\lceil N_{RB}^{UL}/P + 2 \rceil}{4}\right)\right\rceil \text{ or } \left\lceil \log_2\left(\binom{\lceil N_{RB}^{UL}/P \rceil + 2}{4}\right)\right\rceil;$$

and the first demodulation module may be further configured to, when the system bandwidth $N_{RB}^{UL}$ acquired is not within the set {11RB, 12RB, 16RB, 27RB, 32RB, 33RB}, determine, according to the system bandwidth, the number of the total bits of the multi-port frequency domain resource location allocation information is:

$$\left\lceil \log_2\left(\binom{\lceil N_{RB}^{UL}/P + 1 \rceil}{4}\right)\right\rceil;$$

where P is a size of a RBG.

Wherein, the first demodulation module may be further configured to, when the total bits of the multi-port frequency domain resource location allocation information are only used to indicate the uplink frequency domain resource location allocation information, determine, according to the system bandwidth, the number of the total bits of the multi-port frequency domain resource location allocation information is:

$$\max\left\{\left\lceil \log_2\left(\binom{\lceil N_{RB}^{UL}/P + 1 \rceil}{4}\right)\right\rceil, \lceil \log_2(N_{RB}^{UL}(N_{RB}^{UL}+1)/2)\rceil\right\};$$

where P is a size of a RBG and $N_{RB}^{UL}$ is the system bandwidth.

Wherein, the first demodulation module may be further configured to, when the total bits of the multi-port frequency domain resource location allocation information are only used to indicate the uplink frequency domain resource location allocation information, determine, according to the system bandwidth, the number of the total bits of the multi-port frequency domain resource location allocation information is:

$$\left\lceil \log_2\left(\binom{\lceil N_{RB}^{UL}/P + 2 \rceil}{4}\right)\right\rceil \text{ or } \left\lceil \log_2\left(\binom{\lceil N_{RB}^{UL}/P \rceil + 2}{4}\right)\right\rceil;$$

and the first demodulation module may be further configured to, when the total bits of the multi-port frequency domain resource location allocation information are not only used to indicate the uplink frequency domain resource location allocation information, determine, according to the system bandwidth, the number of the total bits of the multi-port frequency domain resource location allocation information is:

$$\left\lceil \log_2\left(\binom{\lceil N_{RB}^{UL}/P + n \rceil}{4}\right)\right\rceil \text{ or } \left\lceil \log_2\left(\binom{\lceil N_{RB}^{UL}/P \rceil + n}{4}\right)\right\rceil;$$

where P is a size of a RBG, $N_{RB}^{UL}$ is the system bandwidth, and n>2.

Wherein, the second demodulation module may be further configured to determine, according to the system bandwidth, the number of bits of a single cluster of uplink frequency domain resource location allocation information is $\lceil \log_2 (N_{RB}^{UL}(N_{RB}^{UL}+1)/2)\rceil$; where $N_{RB}^{UL}$ is the system bandwidth.

In the solution for indicating multi-port frequency domain resource location allocation information according to the disclosure, the number of total bits of multi-port frequency domain resource location allocation information is determined firstly according to a system bandwidth; then the number of bits of (a single cluster of or multiple clusters of) uplink frequency domain resource location allocation information is determined according to the system bandwidth; and at last, the bits of the single cluster of uplink frequency domain resource location allocation information are placed in alignment with the LBS bit of the total bits of the multi-port frequency domain resource location allocation information or with the MBS bit of the total bits of the multi-port frequency domain resource location allocation information; in this way, the problem that the number of total bits of multi-port frequency domain resource location allocation information is insufficient to indicate a single cluster of uplink resource location allocation information under some system bandwidths during uplink transmission can be solved.

DETAILED DESCRIPTION

Figure 1:
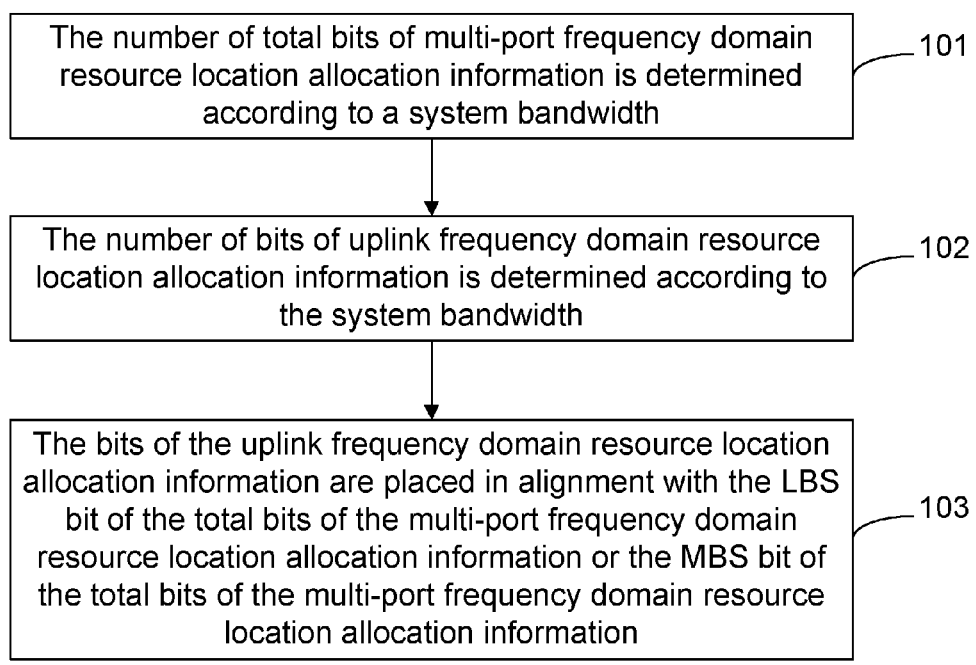
FIG. 1 shows a flow diagram of a method for indicating multi-port frequency domain resource location allocation information according to the disclosure.

Under the circumstances that the number of total bits of multi-port frequency domain resource location allocation information are insufficient to indicate a single cluster of uplink resource location allocation information within a certain system bandwidth during uplink transmission, the disclosure provides a method for indicating multi-port frequency domain resource location allocation information in combination with an existing LTE technology, as shown in FIG. 1, which includes:

Step 101: the number of total bits of multi-port frequency domain resource location allocation information is determined according to a system bandwidth;

Step 102: the number of bits of uplink frequency domain resource location allocation information is determined according to the system bandwidth; and Step 103: the bits of the uplink frequency domain resource location allocation information are placed in alignment with the Least Bit Status (LBS) bit of the total bits of the multi-port frequency domain resource location allocation information or the Most Bit Status (MBS) bit of the total bits of the multi-port frequency domain resource location allocation information.

In the disclosure, the uplink frequency domain resource location allocation information includes a single cluster and multiple clusters.

The technical solution of the disclosure will be described hereinafter by taking indicating a single cluster of uplink frequency domain resource location allocation information for example.

Figure 2:
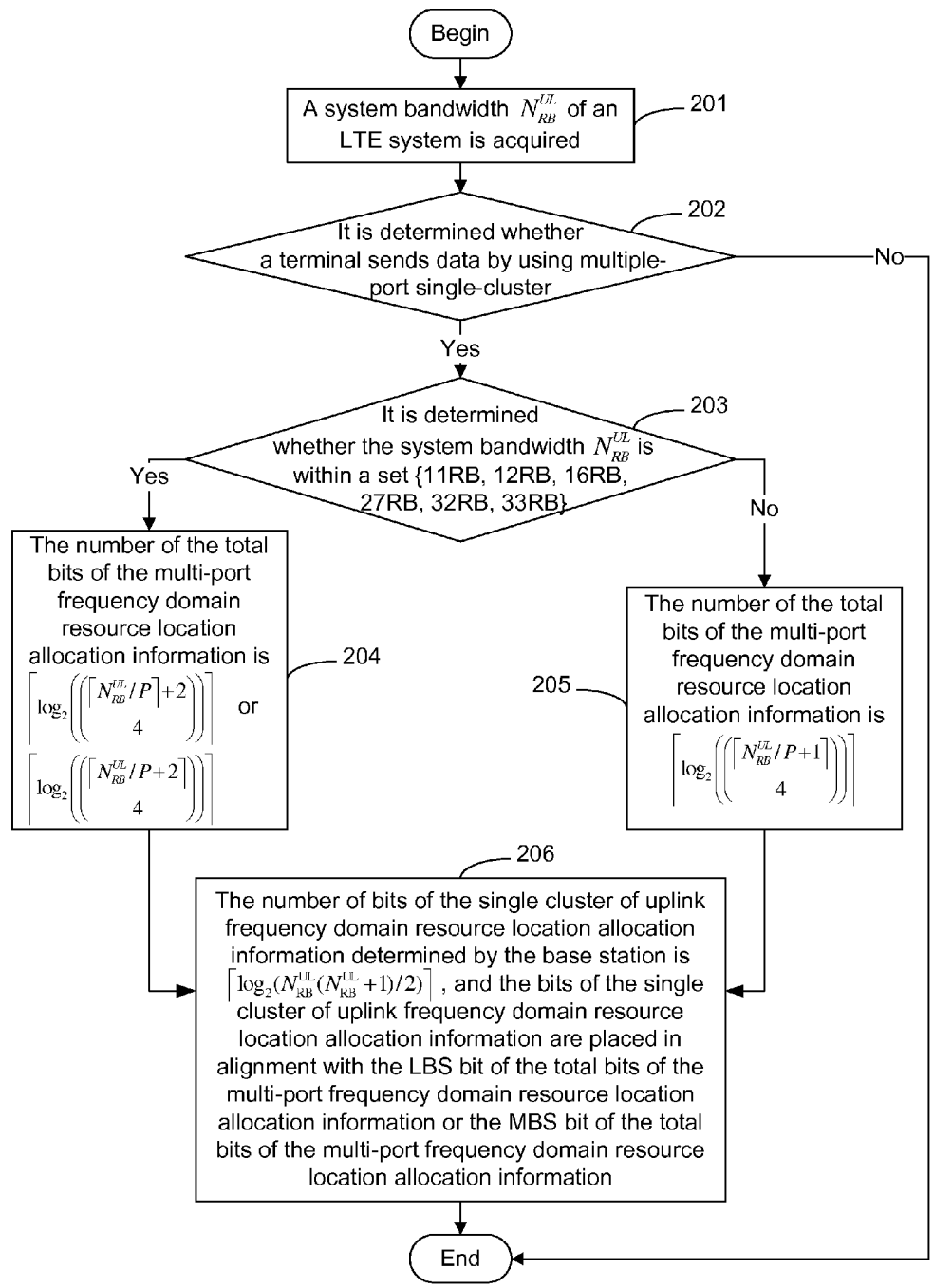
FIG. 2 shows a flow diagram of a method for indicating multi-port frequency domain resource location allocation information according to the first embodiment of the disclosure.

First Embodiment $$\left\lceil \log_2\left(\binom{\lceil N_{RB}^{UL}/P+1\rceil}{4}\right)\right\rceil$$

bits are utilized to indicate a single cluster of uplink frequency domain resource location allocation information. However, when system bandwidths are 11RB, 12RB, 16RB, 27RB, 32RB, 33RB, $$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil$$

bits are utilized to indicate a single cluster of uplink frequency domain resource location allocation information, as shown in FIG. 2, which specifically includes:

Step 201: a system bandwidth $N_{RB}^{UL}$ of an LTE system is acquired;

the realization of this step belongs to a related prior and thus is not be described here in detail;

Step 202: it is determined whether a terminal authorized by a base station sends data by using multiple-port single-cluster; if the base station sends data by using multiple-port single-cluster, Step 203 is executed; otherwise, a multiple-port single-cluster allocation mode exits;

Step 203: it is determined whether the system bandwidth $N_{RB}^{UL}$ is within a set {11RB, 12RB, 16RB, 27RB, 32RB, 33RB}; if the system bandwidth $N_{RB}^{UL}$ is within the set {11RB, 12RB, 16RB, 27RB, 32RB, 33RB}, Step 204 is executed; otherwise, Step 205 is executed;

Step 204: if the system bandwidth $N_{RB}^{UL}$ is within the set {11RB, 12RB, 16RB, 27RB, 32RB, 33RB}, when the terminal performs uplink transmission, the number of the total bits of the multi-port frequency domain resource location allocation information is $$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

and then Step 206 is executed;

Step 205: if the system bandwidth $N_{RB}^{UL}$ is not within the set {11RB, 12RB, 16RB, 27RB, 32RB, 33RB}, when the terminal performs uplink transmission, the number of the total bits of the multi-port frequency domain resource location allocation information is $$\left\lceil \log_2\left(\binom{\lceil N_{RB}^{UL}/P+1\rceil}{4}\right)\right\rceil;$$

and then Step 206 is executed;

Step 206: the base station determines, according to the system bandwidth, the number of bits of the single cluster of uplink frequency domain resource location allocation information (i.e., the number of bits occupied actually by the single cluster of uplink frequency domain resource location allocation information) is $\lceil \log_2(N_{RB}^{UL}(N_{RB}^{UL}+1)/2)\rceil$;

the bits of the single cluster of uplink frequency domain resource location allocation information are placed in alignment with the Least Bit Status (LBS) bit (or called the lowest bit) of the total bits of the multi-port frequency domain resource location allocation information or the Most Bit Status (MBS) bit (or called the highest bit) of the total bits of the multi-port frequency domain resource location allocation information. A specific location is agreed on by the base station and the terminal.

For example, the number of the total bits of the multi-port frequency domain resource location allocation information is 5 bits, and the number of the bits of the single cluster of uplink frequency domain resource location allocation information is 4 bits: 1111. If the bits of the single cluster of uplink frequency domain resource location allocation information are placed in alignment with the LBS bit of the total bits of the multi-port frequency domain resource location allocation information, the single cluster of uplink frequency domain resource location allocation information is 01111. If the bits of the single cluster of uplink frequency domain resource location allocation information are placed in alignment with the MBS bit of the total bits of the multi-port frequency domain resource location allocation information, the single cluster of uplink frequency domain resource location allocation information is 11110.

Figure 3:
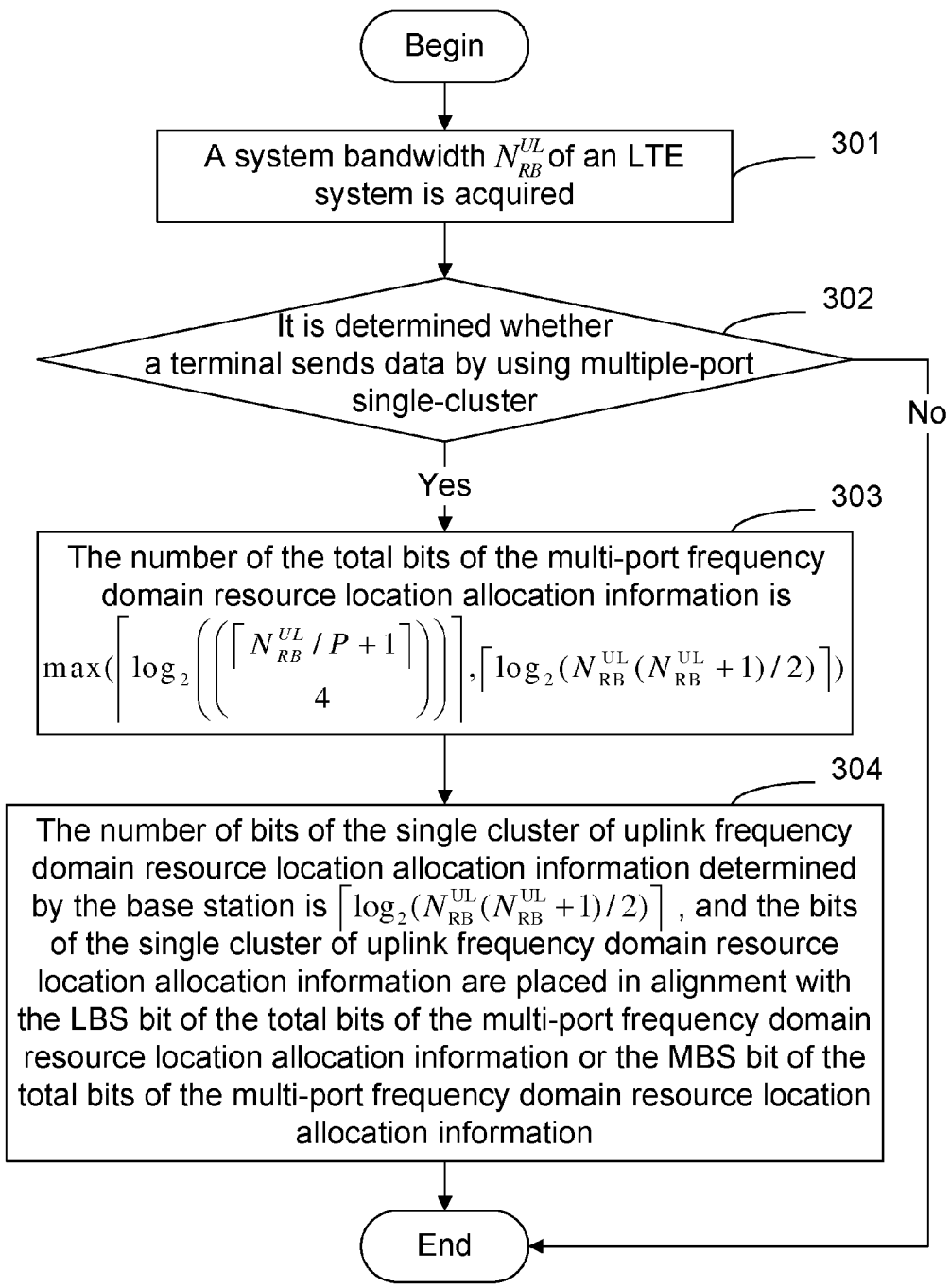
FIG. 3 shows a flow diagram of the method for indicating multi-port frequency domain resource location allocation information according to the second embodiment of the disclosure.

Second Embodiment $$\max\left\{\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right\}$$

bits are utilized to indicate a single cluster of uplink frequency domain resource location allocation information, as shown in FIG. 3, which specifically includes:

Step 301: a system bandwidth $N_{RB}^{UL}$ of an LTE system is acquired;

Step 302: it is determined whether a terminal authorized by a base station sends data by using multiple-port single-cluster; if the base station sends data by using multiple-port single-cluster, Step 303 is executed; otherwise, the multiple-port single-cluster allocation mode exits;

Step 303: when the total bits of the multi-port frequency domain resource location allocation information are only used to indicate the single cluster of uplink frequency domain resource location allocation information, the number of the total bits of the multi-port frequency domain resource location allocation information is:

$$\max\left\{\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right\};$$

Step 304: the base station determines, according to the system bandwidth, the number of bits of the single cluster of uplink frequency domain resource location allocation information to be $\lceil \log_2(N_{RB}^{UL}(N_{RB}^{UL}+1)/2)\rceil$;

the bits of the single cluster of uplink frequency domain resource location allocation information are placed in alignment with the LBS bit of the total bits of the multi-port frequency domain resource location allocation information or with the MBS bit of the total bits of the multi-port frequency domain resource location allocation information. A specific location is agreed on together by the base station and the terminal.

Figure 4:
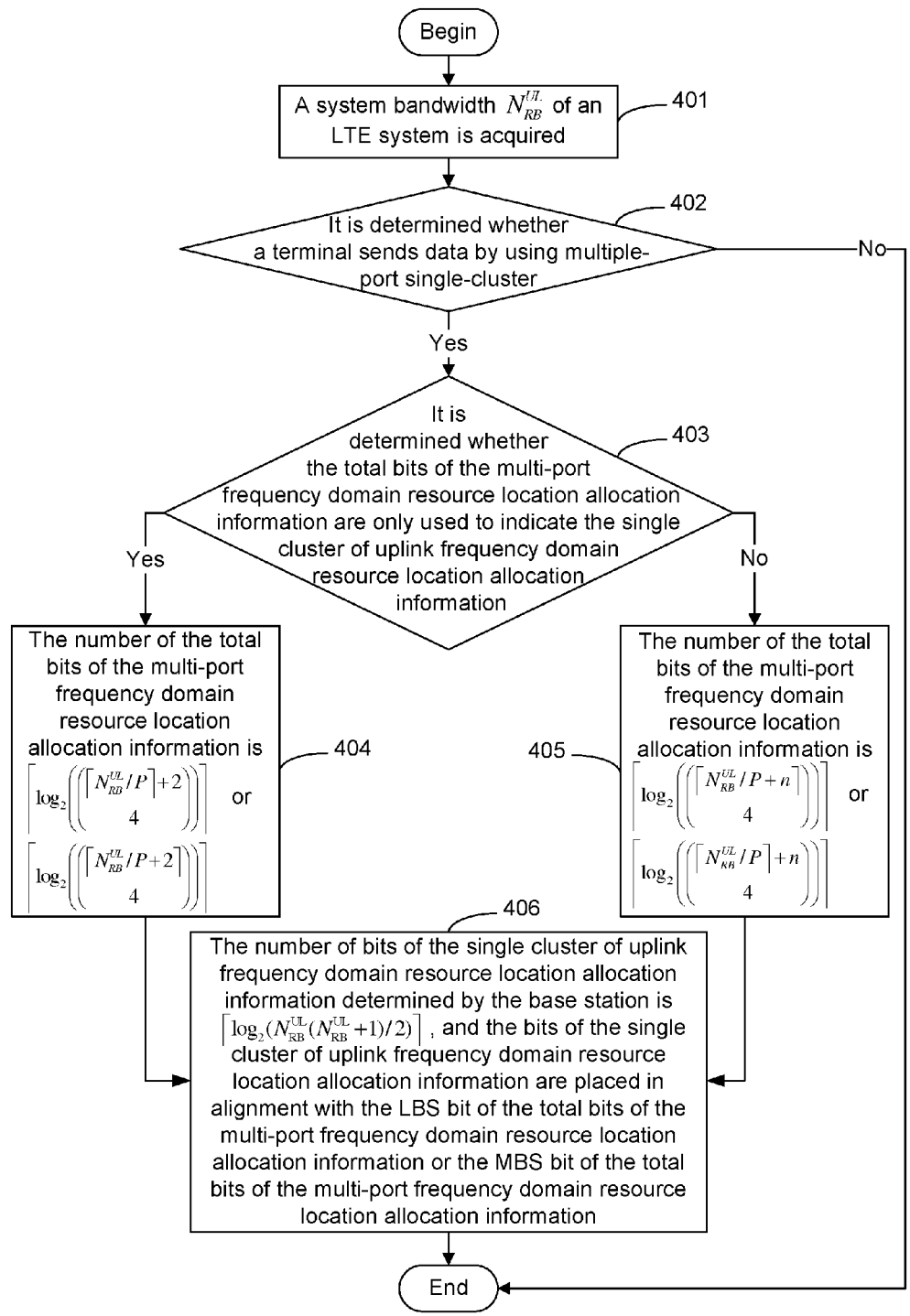
FIG. 4 shows a flow diagram of the method for indicating multi-port frequency domain resource location allocation information according to the third embodiment of the disclosure.

Third Embodiment $$\left\lceil \log_2\left(\binom{\lceil N_{RB}^{UL}/P+n\rceil}{4}\right)\right\rceil \text{ or } \left\lceil \log_2\left(\binom{\lceil N_{RB}^{UL}/P\rceil+n}{4}\right)\right\rceil$$

bits are utilized to indicate a single cluster of uplink frequency domain resource location allocation information, where n>=2, as shown in FIG. 4, which specifically includes:

Step 401: a system bandwidth $N_{RB}^{UL}$ of an LTE system is acquired;

Step 402: it is determined whether a terminal authorized by a base station sends data by using multiple-port single-cluster; if the base station sends data by using multiple-port single-cluster, Step 403 is executed; otherwise, the multiple-port single-cluster allocation mode exits;

Step 403: it is determined whether the total bits of the multi-port frequency domain resource location allocation information are only used to indicate the single cluster of uplink frequency domain resource location allocation information, if the total bits of the multi-port frequency domain resource location allocation information are only used to indicate the single cluster of uplink frequency domain resource location allocation information, Step 404 is executed; otherwise, Step 405 is executed;

Step 404: when the total bits of the multi-port frequency domain resource location allocation information are only used to indicate the single cluster of uplink frequency domain resource location allocation information, the number of the total bits of the multi-port frequency domain resource location allocation information is:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil$$

Step 405: if the total bits of the multi-port frequency domain resource location allocation information are not only used to indicate the single cluster of uplink frequency domain resource location allocation information and there are more information bits needed to indicate other information (for example, except the bits of the multi-port frequency domain resource location allocation information which are used to indicate the single cluster of uplink frequency domain resource location allocation information, more bits are needed to indicate frequency hopping information and the like), then the number of the total bits of the multi-port frequency domain resource location allocation information is:

$$\left\lceil \log_2\left(\binom{\lceil N_{RB}^{UL}/P + n \rceil}{4}\right)\right\rceil \text{ or } \left\lceil \log_2\left(\binom{\lceil N_{RB}^{UL}/P \rceil + n}{4}\right)\right\rceil;$$

Where n>2, and a specific value of n is determined according to need of system; for example, if a system whose system bandwidth is less than 10M enables a frequency hopping function, then n=3; if a system whose system bandwidth is greater than 10M enables a frequency hopping function, then n=4;

Step 406: the base station determines, according to the system bandwidth, the number of bits of the single cluster of uplink frequency domain resource location allocation information is $\lceil \log_2(N_{RB}{}^{UL}(N_{RB}{}^{UL}+1)/2)\rceil$;

the bits of the single cluster of uplink frequency domain resource location allocation information are placed in alignment with the LBS bit of the total bits of the multi-port frequency domain resource location allocation information or with the MBS bit of the total bits of the multi-port frequency domain resource location allocation information. A specific location is agreed on by the base station and the terminal.

In the above embodiments, $$\binom{y}{x} = C_y^x,$$

i.e., a permutation and combination calculation, $$C_y^x = \frac{P_y^x}{x!},$$

for example, if $$\left\lceil \log_2\left(\binom{\lceil N_{RB}^{UL}/P \rceil + 2}{4}\right)\right\rceil$$

is subject to the permutation and combination calculation, then $$\binom{\lceil N_{RB}^{UL}/P \rceil + 2}{4} = C_{\lceil N_{RB}^{UL}/P \rceil+2}^4 = \frac{P_{\lceil N_{RB}^{UL}/P \rceil+2}^4}{4!}.$$

The above embodiments also are suitable for indicating multiple-cluster uplink frequency domain resource location allocation information, but the difference is that the number of bits occupied actually by multiple clusters of uplink frequency domain resource location allocation information is computed in a different way from the number of bits occupied actually by single cluster of uplink frequency domain resource location allocation information; the number of bits occupied actually by multiple clusters of uplink frequency domain resource location allocation information is computed by a related prior art which is not described here in detail.

For an LTE system whose uplink system bandwidth is 100RB, $$\left\lceil \log_2\left(\binom{\lceil N_{RB}^{UL}/P \rceil + 2}{4}\right)\right\rceil = 15$$

bits are used to indicate a single cluster of uplink frequency domain resource location allocation information in the disclosure, while $$\left\lceil \log_2\left(\binom{\lceil N_{RB}^{UL}/P + 1 \rceil}{4}\right)\right\rceil = 14$$

bits are used to indicate a single cluster of uplink frequency domain resource location allocation information in a related prior. The maximum number of bits required by the single cluster of uplink frequency domain resource location allocation information under this system bandwidth is 13.

For an LTE system whose uplink system bandwidth is 6RB, $$\left\lceil \log_2\left(\binom{\lceil N_{RB}^{UL}/P \rceil + 2}{4}\right)\right\rceil = 7$$

bits are used to indicate a single cluster of uplink frequency domain resource location allocation information in the disclosure, while $$\left\lceil \log_2\left(\binom{\lceil N_{RB}^{UL}/P + 1 \rceil}{4}\right)\right\rceil = 6$$

bits are used to indicate a single cluster of uplink frequency domain resource location allocation information in a related prior. The maximum number of bits required by the single cluster of uplink frequency domain resource location allocation information under the system bandwidth is 5.

It can be seen from the above examples that the number of total bits of multi-port frequency domain resource location allocation information provided by the disclosure is sufficient to meet the requirement of a single cluster of uplink frequency domain resource location allocation information.

For a system whose uplink system bandwidth is 12RB, $$\left\lceil \log_2\left(\binom{\lceil N_{RB}^{UL}/P \rceil + 2}{4}\right)\right\rceil = 7$$

bits are used to indicate a single cluster of uplink frequency domain resource location allocation information in the disclosure, while $$\left\lceil \log_2\left(\binom{\lceil N_{RB}^{UL}/P + 1 \rceil}{4}\right)\right\rceil = 6$$

bits are used to indicate a single cluster of uplink frequency domain resource location allocation information in a related prior. However, the maximum number of bits required by the single cluster of uplink frequency domain resource location allocation information under the system bandwidth is 7.

Therefore, it can be seen that the requirement of a single cluster of uplink frequency domain resource location allocation information can not be met by using the related prior while the technology provided by the disclosure can effectively solve this problem.

It can be seen from the above comparison that the method of the disclosure can effectively avoid the problem that the number of bits of multi-port frequency domain resource location allocation information is insufficient when single-cluster location allocation is performed on uplink frequency domain resources under multiple ports in an LTE system.

Figure 5:
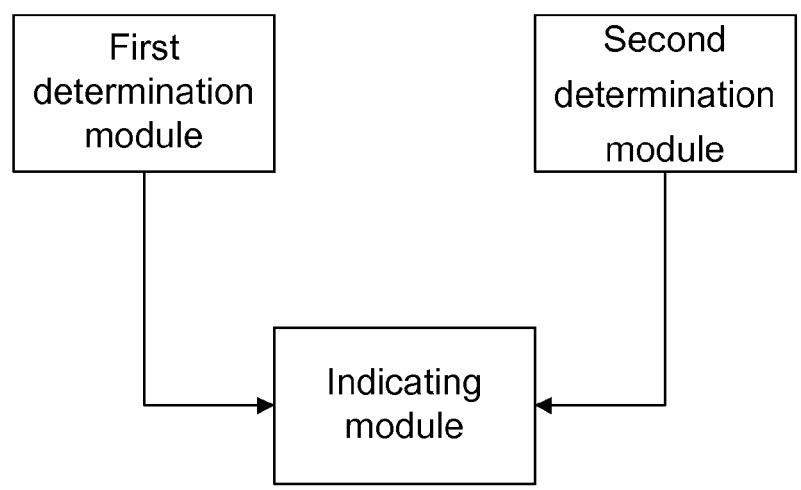
FIG. 5 shows a structural diagram of a device for indicating multi-port frequency domain resource location allocation information according to the disclosure.

In order to realize the above method, the disclosure provides a device for indicating multi-port frequency domain resource location allocation information, as shown in FIG. 5, and the device includes:

a first determination module configured to determine the number of total bits of multi-port frequency domain resource location allocation information according to a system bandwidth;

a second determination module configured to determine the number of bits of uplink frequency domain resource location allocation information according to the system bandwidth; and an indicating module configured to place the bits of the uplink frequency domain resource location allocation information in alignment with an LBS bit of the total bits of the multi-port frequency domain resource location allocation information or with an MBS bit of the total bits of the multi-port frequency domain resource location allocation information.

Wherein, the first determination module is further configured to, when the system bandwidth $N_{RB}^{UL}$ acquired is within a set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

the first determination module is further configured to, when the system bandwidth $N_{RB}^{UL}$ acquired is not within the set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+1\rceil}{4}\right)\right\rceil;$$

where P is a size of a RBG.

Wherein, the first determination module is further configured to, when the number of the total bits of the multi-port frequency domain resource location allocation information is only used to indicate the uplink frequency domain resource location allocation information, determine, according to the system bandwidth, the number of the total bits of the multi-port frequency domain resource location allocation information to be:

$$\max\left\{\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right\};$$

where P is a size of a RBG and $N_{RB}^{UL}$ is the system bandwidth.

The first determination module is further configured to, when the number of the total bits of the multi-port frequency domain resource location allocation information is only used to indicate the uplink frequency domain resource location allocation information, determine, according to the system bandwidth, the number of the total bits of the multi-port frequency domain resource location allocation information to be:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

and the first determination module is further configured to, when the number of the total bits of the multi-port frequency domain resource location allocation information is not only used to indicate the uplink frequency domain resource location allocation information, determine, according to the system bandwidth, the number of the total bits of the multi-port frequency domain resource location allocation information to be:

$$\left\lceil \log_2\left(\binom{\lceil N_{RB}^{UL}/P+n\rceil}{4}\right)\right\rceil \text{ or } \left\lceil \log_2\left(\binom{\lceil N_{RB}^{UL}/P\rceil+n}{4}\right)\right\rceil;$$

where P is a size of a RBG, $N_{RB}^{UL}$ is the system bandwidth, and n>2.

The second determination module is further configured to determine, according to the system bandwidth, the number of the bits of the single cluster of uplink frequency domain resource location allocation information is $\lceil \log_2(N_{RB}^{UL}(N_{RB}^{UL}+1)/2)\rceil$; where $N_{RB}^{UL}$ is the system bandwidth.

The disclosure further provides a terminal to which the above method is applicable, which includes:

a receiving module configured to receive multi-port frequency domain resource location allocation information from a network side;

a first demodulation module configured to determine the number of total bits of the multi-port frequency domain resource location allocation information according to a system bandwidth;

a second demodulation module configured to determine the number of bits of uplink frequency domain resource location allocation information according to the system bandwidth; and a third demodulation module configured to place the bits of the uplink frequency domain resource location allocation information in alignment with an LBS bit of the total bits of the multi-port frequency domain resource location allocation information or with an MBS bit of the total bits of the multi-port frequency domain resource location allocation information.

Specifically, the third demodulation module is further configured to, based on the manner of placing the bits of the uplink frequency domain resource location allocation information in alignment with an LBS bit of the total bits of the multi-port frequency domain resource location allocation information, acquire the uplink frequency domain resource location allocation information from a side of the least bit of the total bits of the multi-port frequency domain resource location allocation information according to the number of the bits of the uplink frequency domain resource location allocation information; and the third demodulation module is further configured to, based on the manner of placing the bits of the uplink frequency domain resource location allocation information in alignment with an MBS bit of the total bits of the multi-port frequency domain resource location allocation information, acquire the uplink frequency domain resource location allocation information from a side of the most bit of the total bits of the multi-port frequency domain resource location allocation information according to the number of the bits of the uplink frequency domain resource location allocation information.

The number of total bits of multi-port frequency domain resource location allocation information is determined as follows:

the first demodulation module is further configured to, when the system bandwidth $N_{RB}^{UL}$ acquired is within a set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

and the first demodulation module is further configured to, when the system bandwidth $N_{RB}^{UL}$ acquired is not within the set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+1\rceil}{4}\right)\right\rceil;$$

where P is a size of a RBG.

The first demodulation module is further configured to, when the number of the total bits of the multi-port frequency domain resource location allocation information is only used to indicate the uplink frequency domain resource location allocation information, determine, according to the system bandwidth, the number of the total bits of the multi-port frequency domain resource location allocation information to be:

$$\max\left(\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right);$$

where P is a size of a RBG and $N_{RB}^{UL}$ is the system bandwidth.

The first demodulation module is further configured to, when the number of the total bits of the multi-port frequency domain resource location allocation information is only used to indicate the uplink frequency domain resource location allocation information, determine, according to the system bandwidth, the number of the total bits of the multi-port frequency domain resource location allocation information to be:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

and the first demodulation module is further configured to, when the number of the total bits of the multi-port frequency domain resource location allocation information is not only used to indicate the uplink frequency domain resource location allocation information, determine, according to the system bandwidth, the number of the total bits of the multi-port frequency domain resource location allocation information to be:

$$\left\lceil \log_2\left(\binom{\lceil N_{RB}^{UL}/P+n\rceil}{4}\right)\right\rceil \text{ or } \left\lceil \log_2\left(\binom{\lceil N_{RB}^{UL}/P\rceil+n}{4}\right)\right\rceil;$$

where P is a size of a RBG, $N_{RB}^{UL}$ is the system bandwidth, and n>2.

The number of bits of a single cluster of uplink frequency domain resource location allocation information is determined as follows:

the second demodulation module is further configured to determine, according to the system bandwidth, the number of the bits of the single cluster of uplink frequency domain resource location allocation information is $\lceil \log_2(N_{RB}^{UL}(N_{RB}^{UL}+1)/2)\rceil$; where $N_{RB}^{UL}$ is the system bandwidth.

According to the above solution, operations of a terminal are illustrated below by examples:

1. it is assumed that a network side sends multi-port frequency domain resource location allocation information "01111" to a terminal;

2. after receiving the information from the network side, the terminal needs to parse the information "01111": first the terminal needs to determine the number of total bits of multi-port frequency domain resource location allocation information is 5 and the number of bits of single cluster of uplink frequency domain resource location allocation information is 4; and 3. according to an alignment mode agreed by the terminal and the network side, for example, "placing the bits of the single cluster of uplink frequency domain resource location allocation information in alignment with the LBS bit of the total bits of the multi-port frequency domain resource location allocation information" in the embodiment, the terminal can parse"01111" from the side of the least bit to parse 4 bits to obtain the single cluster of uplink frequency domain resource location allocation information "1111".

The above are only preferred embodiments of the present disclosure, and are not used for limiting the scope of protection of the present disclosure.

The invention claimed is:
1. A method for indicating multi-port frequency domain resource location allocation information, comprising:
determining the number of total bits of multi-port frequency domain resource location allocation information according to a system bandwidth;

determining the number of bits of uplink frequency domain resource location allocation information according to the system bandwidth; and placing the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information;

wherein the determining the number of total bits of multi-port frequency domain resource location allocation information according to a system bandwidth comprises:

when the system bandwidth $N_{RB}^{UL}$ acquired is within a set {11RB, 12RB, 16RB, 27RB, 32RB, 33RB}, the number of the total bits of the multi-port frequency domain resource location allocation information is:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

when the system bandwidth $N_{RB}^{UL}$ acquired is not within the set {11RB, 12RB, 16RB, 27RB, 32RB, 33RB}, the number of the total bits of the multi-port frequency domain resource location allocation information is:

$$\left\lceil \log_2\left(\binom{\lceil N_{RB}^{UL}/P+1\rceil}{4}\right)\right\rceil;$$

where P is a size of a resource block group (RBG);

wherein when the number of the bits of the uplink frequency domain resource location allocation information is the number of bits of a single cluster of uplink frequency domain resource location allocation information, the number of the bits of the single cluster of uplink frequency domain resource location allocation information determined according to the system bandwidth is $\lceil \log_2(N_{RB}^{UL}(N_{RB}^{UL}+1)/2)\rceil$; where $N_{RB}^{UL}$ is the system bandwidth.

2. A method for indicating multi-port frequency domain resource location allocation information, comprising:

determining the number of total bits of multi-port frequency domain resource location allocation information according to a system bandwidth;

determining the number of bits of uplink frequency domain resource location allocation information according to the system bandwidth; and placing the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information;

wherein the determining the number of total bits of multi-port frequency domain resource location allocation information according to a system bandwidth comprises:

when the total bits of the multi-port frequency domain resource location allocation information are only used to indicate the uplink frequency domain resource location allocation information, the number of the total bits of the multi-port frequency domain resource location allocation information is:

$$\max\left(\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right)$$

or, $$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil$$

when the total bits of the multi-port frequency domain resource location allocation information are not only used to indicate the uplink frequency domain resource location allocation information, the number of the total bits of the multi-port frequency domain resource location allocation information is:

$$\left\lceil \log_2\left(\binom{\lceil N_{RB}^{UL}/P+n\rceil}{4}\right)\right\rceil \text{ or } \left\lceil \log_2\left(\binom{\lceil N_{RB}^{UL}/P\rceil+n}{4}\right)\right\rceil;$$

wherein when the number of the bits of the uplink frequency domain resource location allocation information is the number of bits of a single cluster of uplink frequency domain resource location allocation information, the number of the bits of the single cluster of uplink frequency domain resource location allocation information determined according to the system bandwidth is $\lceil \log_2(N_{RB}^{UL}(N_{RB}^{UL}+1)/2)\rceil$;

where P is a size of a resource block group (RBG), $N_{RB}^{UL}$ is the system bandwidth, and n>2.

3. A device for indicating multi-port frequency domain resource location allocation information, comprising:

a first determination module configured to determine the number of total bits of multi-port frequency domain resource location allocation information according to a system bandwidth;

a second determination module configured to determine the number of bits of uplink frequency domain resource location allocation information according to the system bandwidth; and an indicating module configured to place the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information;

wherein the first determination module is further configured to, when the system bandwidth $N_{RB}^{UL}$ acquired is within a set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

the first determination module is further configured to, when the system bandwidth $N_{RB}^{UL}$ acquired is not within the set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+1\rceil}{4}\right)\right\rceil;$$

where P is a size of a resource block group (RBG);
the second determination module is further configured to determine, according to the system bandwidth, the number of bits of a single cluster of uplink frequency domain resource location allocation information to be $\lceil \log_2 (N_{RB}^{UL}(N_{RB}^{UL}+1)/2)\rceil$; where $N_{RB}^{UL}$ is the system bandwidth.

4. A device for indicating multi-port frequency domain resource location allocation information, comprising:
  a first determination module configured to determine the number of total bits of multi-port frequency domain resource location allocation information according to a system bandwidth;
  a second determination module configured to determine the number of bits of uplink frequency domain resource location allocation information according to the system bandwidth; and
  an indicating module configured to place the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information;
  wherein the first determination module is further configured to, when the total bits of the multi-port frequency domain resource location allocation information are only used to indicate the uplink frequency domain resource location allocation information, determine, according to the system bandwidth, the number of the total bits of the multi-port frequency domain resource location allocation information to be:

$$\max\left(\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right)$$

or $$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil$$

the first determination module is further configured to, when the total bits of the multi-port frequency domain resource location allocation information are not only used to indicate the uplink frequency domain resource location allocation information, determine, according to the system bandwidth, the number of the total bits of the multi-port frequency domain resource location allocation information to be:

$$\left\lceil \log_2\left(\binom{\lceil N_{RB}^{UL}/P+n\rceil}{4}\right)\right\rceil \text{ or } \left\lceil \log_2\left(\binom{\lceil N_{RB}^{UL}/P\rceil+n}{4}\right)\right\rceil;$$

the second determination module is further configured to determine, according to the system bandwidth, the number of bits of a single cluster of uplink frequency domain resource location allocation information to be $\lceil \log_2 (N_{RB}^{UL}(N_{RB}^{UL}+1)/2)\rceil$;
where P is a size of a resource block group (RBG), $N_{RB}^{UL}$ is the system bandwidth, and n>2.

5. A terminal, comprising:
  a receiving module configured to receive multi-port frequency domain resource location allocation information from a network side;
  a first demodulation module configured to the number of total bits of the multi-port frequency domain resource location allocation information according to a system bandwidth;
  a second demodulation module configured to determine the number of bits of uplink frequency domain resource location allocation information according to the system bandwidth; and
  a third demodulation module configured to place the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information;
  wherein the third demodulation module is further configured to, based on the manner of placing the bits of the uplink frequency domain resource location allocation information in alignment with the LBS bit of the total bits of the multi-port frequency domain resource location allocation information, acquire the uplink frequency domain resource location allocation information from a side of a least bit of the total bits of the multi-port frequency domain resource location allocation information according to the number of the bits of the uplink frequency domain resource location allocation information; and
  the third demodulation module is further configured to, based on the manner of placing the bits of the uplink frequency domain resource location allocation information in alignment with the MBS bit of the total bits of the multi-port frequency domain resource location allocation information, acquire the uplink frequency domain resource location allocation information from a side of a most bit of the total bits of the multi-port frequency domain resource location allocation information according to the number of the bits of the uplink frequency domain resource location allocation information;
  the second demodulation module is further configured to determine, according to a system bandwidth, the number of bits of a single cluster of uplink frequency domain resource location allocation information to be: $\lceil \log_2 (N_{RB}^{UL}(N_{RB}^{UL}+1)/2)\rceil$; where $N_{RB}^{UL}$ is the system bandwidth.

6. A terminal, comprising:
a receiving module configured to receive multi-port frequency domain resource location allocation information from a network side;
a first demodulation module configured to the number of total bits of the multi-port frequency domain resource location allocation information according to a system bandwidth;
a second demodulation module configured to determine the number of bits of uplink frequency domain resource location allocation information according to the system bandwidth; and
a third demodulation module configured to place the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information,
wherein the first demodulation module is further configured to, when the system bandwidth $N_{RB}^{UL}$ acquired is within a set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

and
the first demodulation module is further configured to, when the system bandwidth $N_{RB}^{UL}$ acquired is not within the set {11RB, 12RB, 16RB, 27RB, 32RB, 33RB}, determine, according to the system bandwidth, the number of the total bits of the multi-port frequency domain resource location allocation information to be:

$$\left\lceil \log_2\left(\binom{\lceil N_{RB}^{UL}/P+1\rceil}{4}\right)\right\rceil;$$

where P is a size of a resource block group (RBG);
the second demodulation module is further configured to determine, according to a system bandwidth, the number of bits of a single cluster of uplink frequency domain resource location allocation information to be: $\lceil \log_2(N_{RB}^{UL}(N_{RB}^{UL}+1)/2)\rceil$; where $N_{RB}^{UL}$ is the system bandwidth.

7. A terminal, comprising:
a receiving module configured to receive multi-port frequency domain resource location allocation information from a network side;
a first demodulation module configured to the number of total bits of the multi-port frequency domain resource location allocation information according to a system bandwidth;
a second demodulation module configured to determine the number of bits of uplink frequency domain resource location allocation information according to the system bandwidth; and
a third demodulation module configured to place the bits of the uplink frequency domain resource location allocation information in alignment with a Least Bit Status (LBS) bit of the total bits of the multi-port frequency domain resource location allocation information or with a Most Bit Status (MBS) bit of the total bits of the multi-port frequency domain resource location allocation information,
wherein the first demodulation module is further configured to, when the total bits of the multi-port frequency domain resource location allocation information are only used to indicate the uplink frequency domain resource location allocation information, determine, according to the system bandwidth, the number of the total bits of the multi-port frequency domain resource location allocation information to be:

$$\max\left(\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right)$$

or $$\left\lceil \log_2\left(\binom{\lceil N_{RB}^{UL}/P+2\rceil}{4}\right)\right\rceil \text{ or } \left\lceil \log_2\left(\binom{\lceil N_{RB}^{UL}/P\rceil+2}{4}\right)\right\rceil;$$

the first demodulation module is further configured to, when the total bits of the multi-port frequency domain resource location allocation information are not only used to indicate the uplink frequency domain resource location allocation information, determine, according to the system bandwidth, the number of the total bits of the multi-port frequency domain resource location allocation information to be:

$$\left\lceil \log_2\left(\binom{\lceil N_{RB}^{UL}/P+n\rceil}{4}\right)\right\rceil \text{ or } \left\lceil \log_2\left(\binom{\lceil N_{RB}^{UL}/P\rceil+n}{4}\right)\right\rceil;$$

the second demodulation module is further configured to determine, according to a system bandwidth, the number of bits of a single cluster of uplink frequency domain resource location allocation information to be: $\lceil \log_2(N_{RB}^{UL}(N_{RB}^{UL}+1)/2)\rceil$;
where P is a size of a resource block group (RBG), $N_{RB}^{UL}$ is the system bandwidth, and n>2.

* * * * *